(12) United States Patent
Powell et al.

(10) Patent No.: US 8,669,738 B1
(45) Date of Patent: Mar. 11, 2014

(54) POWER RECOVERY CONTROLLER

(71) Applicant: Colorado Energy Research Technologies, Littleton, CO (US)

(72) Inventors: Wayne J. Powell, Centennial, CO (US); Robert D. Boehmer, Centennial, CO (US); Lee L. Johnson, Littleton, CO (US)

(73) Assignee: Colorado Energy Research Technologies, LLC, Englewood, CO (US)

( * ) Notice: Subject to any disclaimer, the term of this patent is extended or adjusted under 35 U.S.C. 154(b) by 0 days.

(21) Appl. No.: 13/726,828

(22) Filed: Dec. 26, 2012

(51) Int. Cl.
*H02J 7/00* (2006.01)

(52) U.S. Cl.
USPC .......................................... 320/107; 320/138

(58) Field of Classification Search
USPC ................................. 320/107, 138, 139, 101
See application file for complete search history.

(56) References Cited

U.S. PATENT DOCUMENTS

| | | | |
|---|---|---|---|
| 4,355,275 A | 10/1982 | Anglin | |
| 4,637,835 A | 1/1987 | Nagle | |
| 5,296,797 A * | 3/1994 | Bartlett | 320/145 |
| 5,411,816 A * | 5/1995 | Patino | 320/152 |
| 5,633,574 A | 5/1997 | Sage | |
| 5,891,590 A * | 4/1999 | King | 429/49 |
| 6,229,287 B1 * | 5/2001 | Ferris et al. | 320/141 |
| 6,239,578 B1 * | 5/2001 | Schnell et al. | 320/119 |
| 6,534,955 B1 * | 3/2003 | Wae | 320/139 |
| 6,891,355 B2 * | 5/2005 | Kernahan | 323/282 |
| 7,301,308 B2 * | 11/2007 | Aker et al. | 320/139 |
| 8,120,342 B1 | 2/2012 | Fee et al. | |
| 8,188,718 B2 | 5/2012 | Fee et al. | |
| 8,207,707 B2 | 6/2012 | Hart et al. | |
| 8,237,402 B2 | 8/2012 | Julstrom et al. | |
| 2009/0309553 A1 * | 12/2009 | Marinka-Toth et al. | 320/155 |
| 2010/0167368 A1 | 7/2010 | Kawasaki | |

FOREIGN PATENT DOCUMENTS

| | | |
|---|---|---|
| CN | 102382908 | 3/2012 |
| WO | 03/088447 | 10/2003 |
| WO | 2009/005168 | 1/2009 |
| WO | 2009/035611 | 3/2009 |
| WO | 2012/116201 | 8/2012 |

* cited by examiner

*Primary Examiner* — Yalkew Fantu
(74) *Attorney, Agent, or Firm* — Fish & Associates, PC

(57) ABSTRACT

The inventive subject matter provides a circuit and a method for efficiently charging a battery. In one aspect of the invention, the circuit includes an oscillator that generates a series of current pulses at a frequency that corresponds to a resonant frequency of the battery. Each pulse in the series includes ringing oscillations that includes a main pulse and a group of ringing decaying pulses. The group of ringing decaying pulses includes pulses with gradually smaller amplitudes over time until the pulses completely die out.

16 Claims, 1 Drawing Sheet

POWER RECOVERY CONTROLLER

FIELD OF THE INVENTION

The field of the invention is battery charging techniques.

BACKGROUND

The following description includes information that may be useful in understanding the present invention. It is not an admission that any of the information provided herein is prior art or relevant to the presently claimed invention, or that any publication specifically or implicitly referenced is prior art.

Traditional techniques of charging batteries are inefficient. In particular, when it pushes a current through a battery, only a small amount of the current is retained within the battery while most of it is converted into heat energy. As such, the traditional battery charging techniques can take hours to provide a full charge to a battery or battery pack. They are also limited to charging non-primary (i.e., rechargeable) batteries such as Nickel Metal Hydride (NiMH) batteries or Lithium Ion (Li-Ion) batteries. In addition, once batteries fall below a certain capacity and/or voltage, they are considered "dead" and are not recoverable using the traditional battery chargers that are available on the market.

Efforts have been made to improve the efficiency of battery chargers. For example, pulse charging, in which a series of current pulses is fed to the battery, has been known to be more effective than traditional battery charging techniques. The current pulses are also known to break down the sulfation on the plates, which allows the battery to last longer.

With pulse charging, one of the varying factors is the pulse frequency. It is known that batteries usually accept charges most efficiently when being charged with pulses at the batteries' resonant frequencies. U.S. Pat. No. 8,207,707 to Hart et al. issued Jun. 26, 2012, entitled "Method and Apparatus to Provide Fixed Frequency Charging Signals to a Battery At Or Near Resonance" discloses a battery charger with a fixed frequency charging signal at or near the resonant frequency of the battery to be charged.

U.S. Pat. No. 8,120,324 to Fee et al. issued Feb. 2, 2012, entitled "Method and Apparatus to Provide Battery Rejuvenation At Or Near Resonance" also discloses the use of a battery's resonant frequency to rejuvenate the battery that has lost capacity.

While different types of batteries have different resonant frequencies, different charge states of a battery also have slightly different resonant frequencies. International patent publication WO2009/035611 to Fee et al., filed Sep. 12, 2007, entitled "Method and Apparatus to Determine Battery Resonance" discloses a method of determining the resonant frequency of a battery at different charge state so that pulses can be generated at the correct resonant frequency to a battery depending on the battery's charge state.

The above-described techniques have greatly improved the efficiencies of battery charging when compared with traditional charging techniques. Their efficiencies are good enough for charging batteries for small appliances (e.g., AA, AAA batteries). However, existing technologies are still not capable of providing good charge time for large batteries such as electric cars' batteries. For example, Tesla® has reported that its electric car batteries requires four hours to charge from empty to full capacity using a 240 V charger on a 90 A circuit breaker (best scenario) and requires forty-eight hours to charge the same using a 120 V household outlet on a 15 A circuit breaker.

Thus, there is still a need to improve on existing battery charging techniques.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

SUMMARY OF THE INVENTION

The inventive subject matter provides apparatus, systems and methods for efficiently charging a battery. In one aspect of the invention a method for charging a battery is provided. The method includes the step of determining a resonant frequency of the battery. The method also includes the step of feeding a series of current pulses through the battery at a frequency that corresponds to the resonant frequency. Each current pulse in the series comprises a main pulse and a group of ringing decaying pulses.

In some embodiments, each pulse in the group of decaying current pulses has a smaller amplitude than the main pulse. In particular, a first decaying pulse has a larger amplitude than a second subsequent decaying pulse in the group of ringing decaying pulses.

The method according to some embodiments of the invention can charge a primary battery or a secondary battery.

In some embodiments, the step of feeding the series of current pulses includes feeding a first series of current pulses through the battery at the frequency during a first interval of time, providing a resting period in which no current pulses is fed through the battery, and after the resting period, feeding a second series of current pulses through the battery at the frequency during a second subsequent interval of time.

In some embodiments, the series of current pulses are fed through the battery at a frequency that is within 5% of the resonant frequency determined for the battery. As used herein, the resonant frequency of the battery is defined as a frequency within a range of frequencies at which the battery accepts electric charges at an optimal efficiency.

In addition, in some embodiments, the feeding of the series of current pulses is operated at a duty cycle of no more than 50%.

In another aspect of the invention a circuit for efficiently charging a battery is provided. In some embodiments, the circuit includes an oscillator configured to generate current pulses at a frequency that corresponds to a resonant frequency of the battery. Each of the current pulses comprises a main pulse and a group of ringing decaying pulses.

In some embodiments, each pulse in the group of decaying current pulses has a smaller amplitude than the main pulse. In particular, a first decaying pulse has a larger amplitude than a second subsequent decaying pulse in the group of ringing decaying pulses.

The circuit according to some embodiments of the invention can charge a primary battery or a secondary battery.

In some embodiments, the oscillator is further configured to feed the series of current pulses through the battery by (i) feeding a first series of current pulses through the battery at the frequency during a first interval of time, (ii) providing a resting period in which no current pulses is fed through the battery, and (iii) after the resting period, feeding a second series of current pulses through the battery at the frequency during a subsequent interval of time.

In some embodiments, the oscillator is further configured to feed the series of current pulses at a frequency that is within 5% of the resonant frequency of the battery. In addition, in some embodiments, the oscillator is further configured to operate the series of current pulses at a duty cycle of no more than 50%.

Various objects, features, aspects and advantages of the inventive subject matter will become more apparent from the following detailed description of preferred embodiments, along with the accompanying drawing figures in which like numerals represent like components.

DETAILED DESCRIPTION

Throughout the following discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In one aspect of the invention, a method and a circuitry for charging a battery or battery pack are provided. In some embodiments, the battery charging circuit charges a battery by providing a series of high voltage pulses at a frequency that corresponds to a resonant frequency of the battery.

Figure 1:
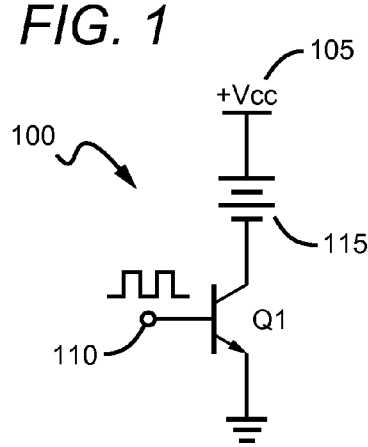
FIG. 1 illustrates an example circuit for efficiently charging batteries.

FIG. 1 illustrates an example circuit 100 of some embodiments for charging a battery. As shown, the circuit 100 comprises a power source 105, an oscillator 110, and a battery 115 to be charged. The power source 105 provides a direct current (DC) into the circuit 100. In some embodiments, the power source 105 can be another battery. In other embodiments, the power source 105 can include an alternating current (AC) power source (e.g., a household outlet) that works together with a rectifier (or a converter) to convert the alternating current into a direct current before feeding through the remaining of the circuit 100.

In some embodiments, the oscillator 110 is configured to generate a series of current (electric) pulses from the power source 105 and feed the series of current pulses through the battery 115. The oscillator 110 can include one or more circuitries, such as a transistor, a transistor driver, that work together to generate the series of current pulses. In some embodiments, the oscillator 110 can also include a frequency controller that allows a user to control and/or adjust the frequency of the current pulses that are fed through the battery.

It is contemplated that providing the series of current pulses at different frequencies to charge a battery yields different charging efficiencies. As used herein, the charging efficiency of a battery is defined as the amount of power input that is required to charge a battery from one charge state to another charge state. It is also noted that charging a battery by feeding the current pulses at the battery's "resonant frequency," and/or its harmonic frequencies, can yield optimal efficiency. As used herein, a resonant frequency is defined as a frequency at which the battery (and any associated circuitry) can be charged with an optimal efficiency within a range of frequencies. In addition, the resonant frequency yields higher charging efficiency than frequencies that are immediately below and above the resonant frequency.

In general, the resonant frequency for a battery can vary depending on the battery's chemistry and the battery's charge state. Different embodiments use different techniques to identify the resonant frequency of a particular battery at a particular charge state. For example, the resonant frequencies can be identified through feeding the battery (while at a particular charge state) with current pulses at different frequencies. One can then measure and record the different charge time to charge the same battery from one charge state to another charge state when supplying the battery with pulses at the different frequencies.

Alternatively, it is contemplated that one can use the circuitry disclosed in International Patent Publication WO 2009/035611 to Fee et al. filed Sep. 11, 2008, entitled "Method and Apparatus to Determine Battery Resonance" ("Fee") to determine the resonant frequency of the battery at its current charge state.

As such, it is contemplated that the oscillator 110 is configured to generate the series of current pulses at (or near) the determined resonant frequency of the battery. In some embodiments, the oscillator 110 is configured to generate the series of current pulses at a frequency that is within 5% of the determined resonant frequency of the battery. In addition, it is also contemplated that the circuit 100 can include the circuitry disclosed in Fee so that the circuit 100 can dynamically adjust the frequency of the pulses to the different resonant frequencies of the battery at the battery's different charge states during the charging process.

In some embodiments, when generating the series of current pulses to the battery, the oscillator 110 is configured to generate the pulses with ringing oscillations. Ringing oscillations are echoes of a main pulse generated by the oscillator 110. They generally include multiple pulses that follow the main pulse with decaying amplitudes over time until they completely die out. These ringing "artifacts" have been perceived to be "noises" and useless in charging batteries. Thus, existing pulse chargers have used different techniques or filters to remove these ringing "artifacts" in order to generate "clean pulses" to charge batteries. However, contrary to what has been widely perceived, it is contemplated herein that these "ringing oscillations" are beneficial to the battery charging process. In particular, it is contemplated that the ringing oscillations of each current pulse allows the electrons in the battery to better realign themselves to prepare for the next pulse, thus further improving the efficiency of the charge. The battery chemistry, density, and physical spacing of the elements can produce adequate variables for different ringing oscillations.

Figure 2:
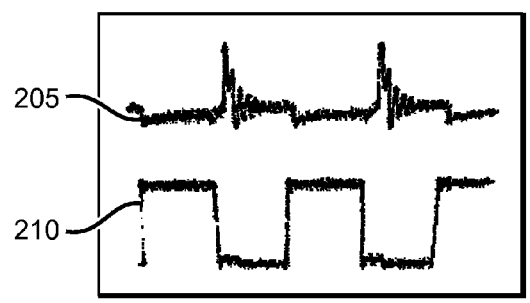
FIG. 2 illustrates a comparison between current pulses with ringing oscillations and current pulses without ringing oscillations.

FIG. 2 illustrates the differences between pulses with ringing oscillations and pulses without ringing oscillations. In particular, FIG. 2 illustrates a view from an oscilloscope that shows two series of pulses, a first series of pulses 205 on the top and a second series of pulses 210 on the bottom. The second series of pulses 210 are produced by existing pulse chargers. As shown, the second series of pulses 210 include clean pulses without any "ringing". That is, each pulse in the second series comprises a shot of current that stays for a pre-determined duration of time and then dies out completely before the second pulse is generated.

By contrast, the first series of pulses 205 have "ringing oscillations". That is, each pulse in the first series comprises a main pulse (a main shot of current generated by an oscillator) that is followed by a group of ringing decaying pulses. As shown, the group of ringing decaying pulses comprises pulses that have continually smaller amplitudes until they completely die out. In some embodiments, the oscillator 110 of the circuit 100 is configured to produce pulses that are similar to the first series of pulses 205 as shown in FIG. 2. The "ringing oscillation" phenomenon can be achieved by first generating a current that constitutes the main pulse, and then allowing the current to naturally oscillate until it completely dies out.

In addition to the ringing oscillations, it is also contemplated that applying one or more resting periods to the series of pulses would improve the charging efficiency of the battery. In some embodiments, the circuit is configured to apply a first series of current pulses to the battery for a first duration of time (e.g., for 30 seconds), then rest for a period of time (e.g., for 30 seconds) in which no current pulse is applied to the battery, and then apply a second series of current pulses to the battery for another duration of time (e.g., 60 seconds). This process of applying a series of pulses, then resting for a period of time, and then applying another series of pulses can repeat until the battery is fully charged.

There are several advantages to using a circuit according to some embodiments of this invention to charge a battery. For example, the circuit 100 can charge either a primary battery or a secondary battery. As used herein, a primary battery (or a primary cell) is a battery that is designed to be used once and discarded because the chemical reactions in the primary battery is designed to be not reversible. In addition, the circuit 100 can rejuvenate a battery that has lost capacity. Moreover, the circuit 100 can charge batteries much more efficiently than existing chargers due to the efficiency gained from including the ringing oscillations in each pulse being fed through the battery.

Figure 3:
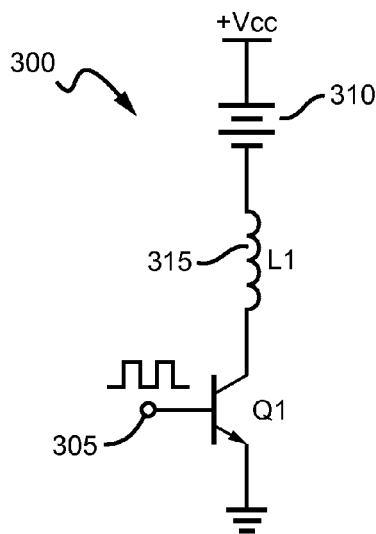
FIG. 3 illustrates another example circuit for efficiently charging batteries.

FIG. 3 illustrates an example circuit 300 of a different embodiment for charging batteries. The circuit 300 is almost identical to the circuit 100 of FIG. 1 except that the circuit 300 incorporates an inductor 315 that is configured to enhance resonance of the series of pulses. The inductor 315 assists in resonating the battery relative to the physical attributes, previously noted.

Figure 4:
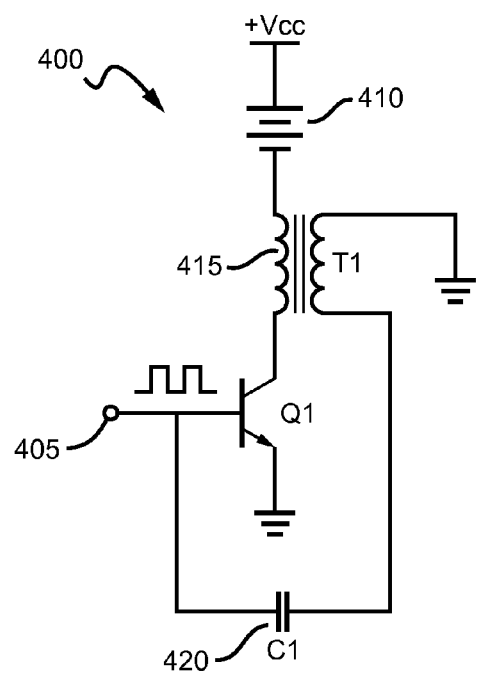
FIG. 4 illustrates another example circuit for efficiently charging batteries.

FIG. 4 illustrates yet another example circuit 400 of some embodiments for charging batteries. The circuit 400 is almost identical to the circuit 100 of FIG. 1 except that the circuit 400 includes a transformer 415 and a capacitor 420. The transformer 415 and capacitor 420 collectively act as a tank circuit and serve as a momentary storage device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of charging a battery:
   determining a resonant frequency of the battery;
   feeding a first series of current pulses through the battery at a frequency that corresponds to the resonant frequency;
   providing, after feeding the first series of current pulses, a resting period in which no current pulse is fed through the battery; and
   feeding, after providing the resting period, a second series of current pulses through the battery at the frequency, wherein each current pulse in the first and second series comprises a main pulse and a group of artificially enhanced ringing decaying pulses.

2. The method of claim 1, wherein each pulse in the group of ringing decaying pulses has a smaller amplitude than the main current pulse.

3. The method of claim 1, wherein a first decaying pulse has a larger amplitude than a second subsequent decaying pulse in the group of ringing decaying current pulses.

4. The method of claim 1, wherein the battery is a primary battery.

5. The method of claim 1, wherein the resting period has a same duration as the first interval of time.

6. The method of claim 1, wherein the series of current pulses is operated at a duty cycle of no more than 50%.

7. The method of claim 1, wherein feeding the series of current pulses comprises feeding the pulses at a frequency that is within 5% of the resonant frequency of the battery.

8. The method of claim 1, wherein the resonant frequency of the battery is a frequency at which the battery accepts electric charges at an optimal efficiency within a range of frequencies.

9. A circuit for charging a battery, comprising
   an oscillator configured to generate (i) feed a first series of current pulses through a battery at a frequency that corresponds to a resonant frequency of the battery, (ii) provide, after feeding the first series of current pulses a resting period in which no current pulse is fed through the battery, and (iii) feed a second series of current pulses through the battery at the frequency, wherein each current pulse in the first and second series of the current pulses comprises a main pulse and a group of ringing decaying pulses; and
   an inductor configured to artificially enhance the group ringing decaying pulses.

10. The circuit of claim 9, wherein each pulse in the group of ringing decaying pulses has a smaller amplitude than the main pulse.

11. The circuit of claim 9, wherein a first decaying current pulse has a larger amplitude than a second subsequent decaying current pulse in the group of ringing decaying current pulses.

12. The circuit of claim 9, wherein the battery is a primary battery.

13. The circuit of claim 9, wherein the resting period has a same duration as the first interval of time.

14. The circuit of claim 9, wherein the oscillator is further configured to operate the series of current pulses at a duty cycle of no more than 50%.

15. The circuit of claim 9, wherein the oscillator is further configured to feed the series of current pulses at a frequency that is within 5% of the resonant frequency of the battery.

16. The circuit of claim 9, wherein the resonant frequency of the battery is a frequency at which the battery accepts electric charges at an optimal efficiency within a range of frequencies.

* * * * *